May 27, 1952 R. E. SOMERS 2,598,458
COMBINATION BOAT AND TRAILER ASSEMBLY
Filed March 23, 1948 2 SHEETS—SHEET 1

INVENTOR
RICHARD E. SOMERS
BY
Robert W Fulander
ATTORNEY

May 27, 1952 R. E. SOMERS 2,598,458
COMBINATION BOAT AND TRAILER ASSEMBLY
Filed March 23, 1948 2 SHEETS—SHEET 2
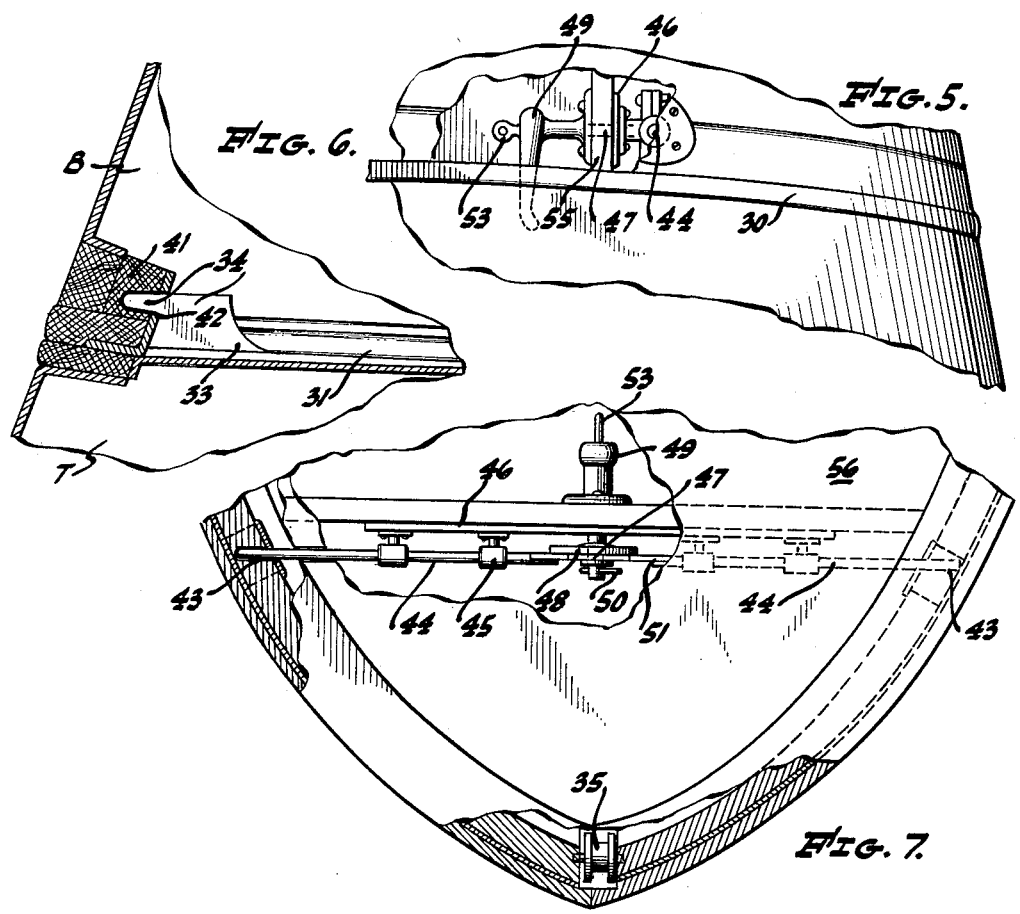
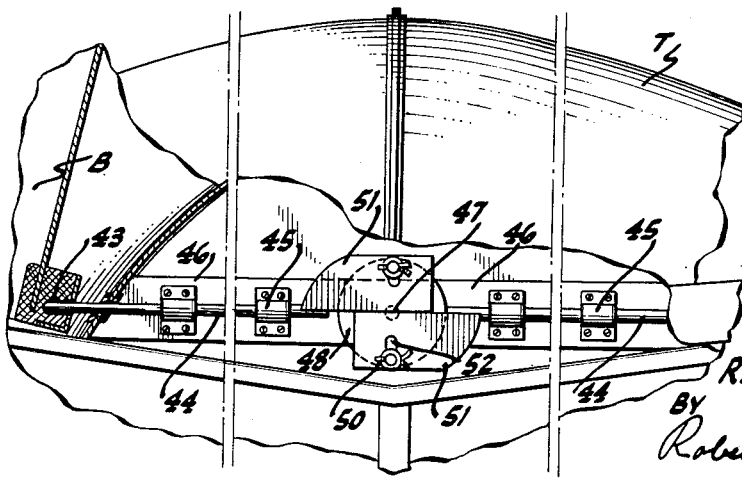
INVENTOR.
RICHARD E. SOMERS.
BY
Robert W Fulwider
ATTORNEY.

Patented May 27, 1952

2,598,458

UNITED STATES PATENT OFFICE 2,598,458

COMBINATION BOAT AND TRAILER ASSEMBLY

Richard E. Somers, San Pedro, Calif.

Application March 23, 1948, Serial No. 16,553

3 Claims. (Cl. 296—23)

My invention relates to the field of power drawn vehicles, and more particularly to a combination boat and trailer assembly adapted for the use of sportsmen.

Although numerous trailers have been devised and marketed in the past, the majority of these devices are primarily adapted for use as living quarters for relatively long periods of time. Obviously, to serve such a purpose the conventional trailers must be of a size to accommodate the numerous conveniences of modern life, with the result that they are bulky and cumbersome, and when being moved by an automobile limit the speed that it can be driven with safety. In addition, the conventional trailer when loaded with the necessary equipment for housekeeping purposes is relatively heavy, and must be moved over a substantially smooth road surface.

It will readily be apparent that the presently available conventional trailers are not adapted for the use of the average hunter, fisherman, or sports enthusiast who wishes to use the minimum amount of time in traveling to the scene of the particular sporting activity in which he is interested. Furthermore, on the average fishing or hunting expedition it is usually necessary to drive over rough and little used roads, with the result that the average heavily laden house trailer is neither able to withstand such rough usage nor adapted for transporting a boat to be used for fishing purposes. It is therefore the purpose of my invention to provide a light weight combination boat and trailer assembly which can be drawn by the conventional automobile at the normal safe driving speed, and is adapted to be moved over the rough roads which will be encountered on the average hunting or fishing trip.

A major object of my invention is to provide a lightweight trailer that will support a boat in an inverted position on the top portion thereof, will be of such a design that the boat can be either mounted or demounted from the trailer by one man, will have means for locking the boat in position on the trailer which can only be operated from the interior thereof, and will be adapted for use either with or without the boat in position on the top portion thereof.

These and other objects and advantages of my invention will become apparent from the following description of a preferred form thereof, and from the drawing illustrating that form in which:

Fig. 5 is a fragmentary vertical side elevational view of the upper portion of the trailer with a section thereof broken away to show the interior locking mechanism utilized in holding the boat in position thereon;

Fig. 6 is a fragmentary vertical cross-sectional view of the upper rearward portion of the trailer showing the combination boat lock and wheel stop used in holding the boat in position on the trailer;

Fig. 7 is a fragmentary plan view of the forward portion of the trailer with the boat in position thereon, with a part of the boat being broken away to show the locking means used in holding the boat in position on the upper portion of the trailer;

Fig. 8 is a combination vertical cross-sectional and elevational view of the upper forward portion of the trailer, with the boat being held in position thereon by a pair of slidably movable rods adapted to be actuated from the interior of the trailer.

Referring to Figs. 1 to 4 inclusive for the general arrangement of my invention it will be seen that a trailer T is pulled by a drawbar D of conventional design from a power vehicle (not shown), with the trailer being adapted to removably support on the top portion thereof an inverted boat B. The trailer T is movably supported on two laterally spaced, pneumatic tired, wheels 10, each of which is mounted on a short outwardly extending horizontal axle.

Figure 2:
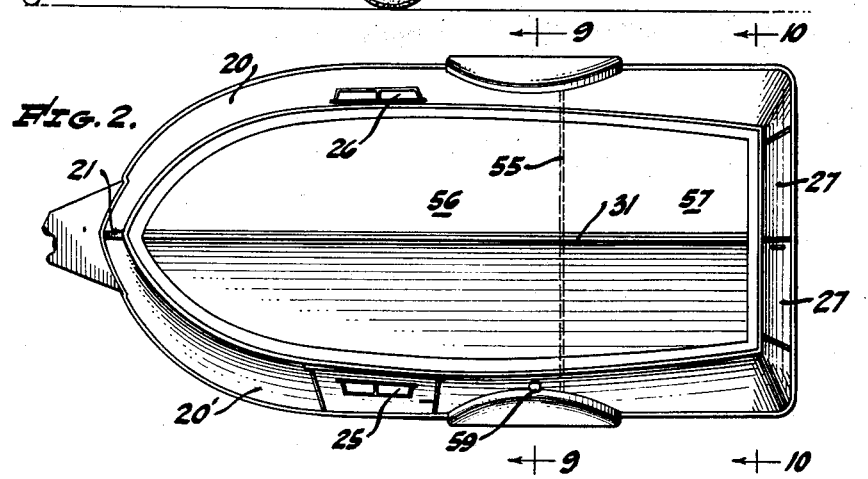
Fig. 2 is a plan view of the trailer.
Figure 3:
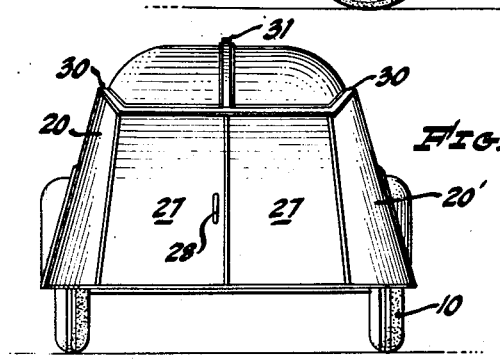
Fig. 3 is a rear elevational view of the trailer.

In Figs. 2 and 3 it will be seen that the trailer T is formed with a recessed wheel well 16 on each longitudinal side thereof. Each of the wheel wells 16 has a curved concave fender 17 extending outwardly therefrom a short distance. With such a spacing of the wheels 10 it will be apparent that the floor area inside the trailer T is widened to the extent that the maximum usable floor area is obtained, which allows considerable space for sleeping purposes, as well as space for the transporting of necessary camping equipment as will hereinafter be explained.

In Fig. 2 it will be noted that the compartment 18 to conform to the body of the trailer T must necessarily have substantially parallel longitudinal side walls that curve inwardly toward the front of the body to terminate at the point 18a. Extending upwardly from the outer portion of the compartment 18 are the two sidewalls 20 and 20' which form the body of the trailer T, with each of the sidewalls sloping slightly inwardly, as may best be seen in Fig. 3 to impart a pleasing appearance to the trailer. The sidewalls 20 and 20' terminate at the forwardly positioned point 18a to form a bow 21 which slopes rearwardly at a slight angle from the vertical.

Figure 1:
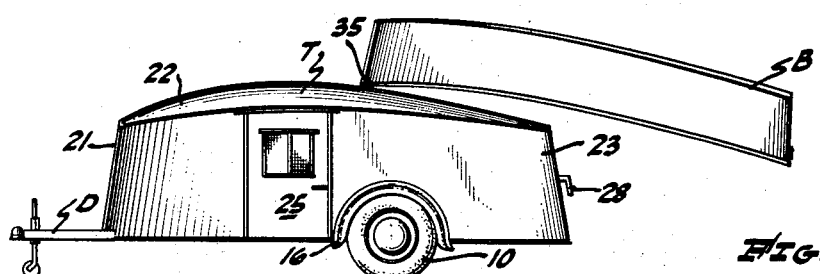
Fig. 1 is a longitudinal side elevational view of my trailer with the boat partially removed therefrom.

In Fig. 1 it will be seen that the upper edges of the sidewalls 20 and 20' are slightly convex, as is the top portion 22 of the trailer T which curves downwardly sharply near the front thereof and then breaks downwardly in a gradual slope to the rear of the trailer.

The sidewalls 20, 20' and the top 22 can of course be fabricated from any one of the metals or materials normally used in trailer constructions, but I prefer to form my trailer from sheet aluminum which is riveted into the desired shape for the outside wall 23. Situated between the wall 23 and an interior wall 24 that is preferably formed from a plywood or a similar material is a layer of insulating material such as glass wool that maintains the interior of the trailer at a relatively constant temperature irrespective of the outdoor conditions. Of course in such a construction the necessary conventional reinforcing members and ribs (not shown) for holding the body of the trailer T in the desired shape are concealed in the space existing between the walls thereof.

Access to the trailer T is had through a horizontally movable hinged door 25 which is formed in the forward portion of the sidewall 20 as can best be seen in Figs. 1 and 2. A window 26 is disposed oppositely from the door 25 in the sidewall 20'. At the rear of the trailer T the sidewalls 20 and 20' turn inwardly slightly, with the interior edge of each sidewall supporting a horizontally movable hinged door 27 the purpose of which will hereinafter be explained. The doors 27 are provided with a conventional lock 28 to hold them in the closed position.

Extending longitudinally along the junction line of the sidewalls 20 and 20' with the top 22 is a wooden rail 30, which is preferably formed of oak that is bent to conform to the contour of the trailer. The upper exterior surface of the rail 30 is substantially flat in order that the gunwales of the boat B can be supported thereon as will hereinafter be explained. In addition to the rail 30 serving as a support for the boat B it also forms a wind and water proof joint between the sidewalls 20, 20' and the trailer top 22.

To permit the boat B being mounted or demounted from the trailer T with a minimum of effort, a metallic rail 31, having a vertical I-shaped cross section, is centrally disposed on the top 22, and extends rearwardly from the upper end of the bow 21 to the rear of the trailer as can best be seen in Figs. 1 and 2. Situated on the rearward portion of the top 22, and having the rail 31 terminate on the vertically curved forward face thereof is a combination wheel stop and boat lock 33. A substantially horizontal pin 34 extends rearwardly from the upper portion of the stop 33, as can best be seen in Fig. 6.

The boat B is of a conventional skiff design which is provided with a rotatably mounted grooved wheel 35 on the bow portion thereof as can best be seen in Fig. 1. With the wheel 35 engaging the rail 31 the boat B can easily be moved along the top 22 of the trailer T to be mounted on or demounted from by one man. To permit the boat B to firmly seat on the rails 31 it is provided with gunwales 36 which are slightly concave and conform to the contour of the supporting rails 30 when the boat is fully positioned thereon.

In construction the boat B is formed from laterally spaced transverse concave ribs (not shown) in accordance with good boat building practice, with the ribs being covered on the exterior thereof with a non-corroding sheet metal material such as aluminum, which is also a highly desirable material for this purpose due to its light weight. Positioned across the interior stern portion of the boat B is a member 41 which is formed with a centrally disposed bore 42 therein. As the boat B is moved forwardly along the top 22 the bow portion of the boat begins to drop down rather rapidly as the boat approaches being fully positioned. At this time the bore 42 is engaged by the pin 34, with the result that the rearward portion of the boat is removably held in position on the top 22. The forward portion of the boat B is held in position on the top 22 by the gunwales 36 being formed with oppositely disposed horizontal bores 43 in the forward portion thereof, with each of the bores being adapted to be engaged by a movably mounted rod 44 as can best be seen in Figs. 7 and 8.

To prevent the unauthorized removal of the boat B from the trailer T the rods 44 are oppositely disposed, with each rod being slidably supported from several U-shaped brackets 45 that are secured to a horizontally positioned crosspiece 46 that is mounted in a convenient manner inside the trailer T. A horizontal shaft 47 extends rearwardly through a bore formed in the crosspiece 46, and rigidly supports on the forward end thereof a vertically positioned circular plate 48, while a handle 49 for rotating the shaft is affixed to the rearward end thereof. The cam 48 is provided with two oppositely disposed forwardly extending pins 50, each of which serves to actuate one of two members 51 by engaging a vertical slot 52 formed therein.

Each of the members 51 is rigidly affixed to one of the rods 44, and as the inner edges of the members are in slidable contact with one another any rotation of the cam 48 by the handle 49 is translated into horizontal movement of the rods 44 to cause them to engage or become disengaged from the bores 43 depending upon the direction of rotation of the handle 49. To prevent the rods 44 from being accidentally disengaged from the bores 43, or from an unauthorized person turning the handle 49 to accomplish this purpose after gaining access to the interior of the trailer T, a conventional lock (not shown) with key 53 is incorporated into the construction of the handle 49.

Figure 4:
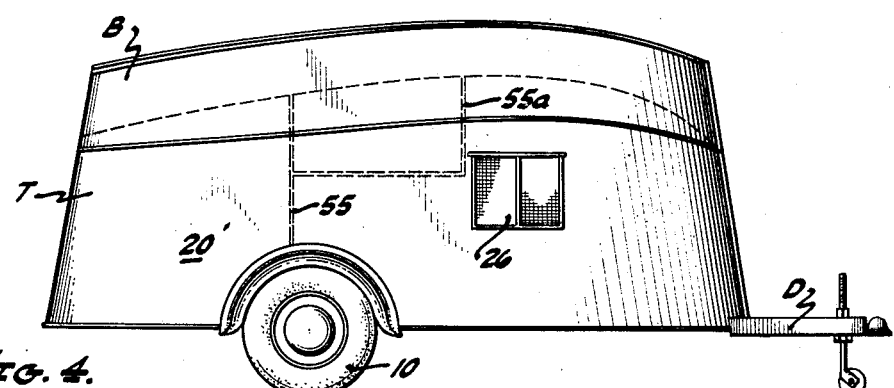
Fig. 4 is a side elevational view of the trailer with the boat in position thereon.

In Fig. 4 it will be seen that extending forwardly from the upper portion of the partition 55 is a compartment having a hinged vertically movable door 55a on the front part thereof which permits access to storage space which is normally occupied by blankets and sleeping equipment.

The operation of my invention is extremely simple. The trailer T when it is desired to use same is affixed to the rear of a conventional power vehicle by the use of the drawbar D, and is pulled in the normal manner to the scene of the particular sporting activity. Should it be desired to use the Boat B after the trailer has been parked in a convenient location the key 53 is used to unlock the handle 49, with the handle then rotated to move the rods 44 inwardly from their engaging position with the gunwales 36. The forward portion of the boat B is now free to move which is accomplished by an individual pulling rearwardly on the boat while he is standing back of the trailer T. The forward portion of the boat B as it moves rearwardly is resting on the wheel 35 which rotates along the rail 31 until it contacts the curved forward face of the wheel stop 33. When this occurs the major portion of the boat removed from the top 22, and the individual removing the boat deposits the stern portion thereof on the ground. He then walks to the trailer to grasp the bow portion of the boat B in his hands in order that this portion of the boat may also be placed on the ground. The boat B is then rightened from the inverted position which it is occupying on the ground, and is ready for use. Removable oarlocks (not shown) are placed in the gunwales of the boat in vertical bores provided for same, and the oars which are normally carried in the compartment 18 are removed therefrom for use with the boat.

The doors 27 in the rear of the trailer are then unlocked, and the various compartments in the rear portion 57 of the trailer used in accordance with the needs of the sportsman. Sleeping accommodations are of course furnished in the forward portion 56 of the trailer, with the blankets being removed from the compartment which is normally closed by the door 55a to be spread on the floor 19.

Upon the hunting or fishing expedition having been completed the bow of the boat B is placed on the top 22 of the trailer with the wheel 35 engaging the rail 31. The stern of the boat B is then lifted and the boat is pushed forwardly until the gunwales 36 thereof sit on the rails 30. Due to the bow portion dropping downward as the boat B becomes fully positioned the pin 34 is permitted to engage the bore 42 to hold the stern portion of the boat in a fixed position with relation to the top 22 of the trailer. The handle 49 is then rotated in a direction opposite from that previously used in removing the boat from the trailer T, with the result that the rods 44 are caused to move outwardly to engage the bores formed in the gunwales 36 as shown in Figs. 7 and 8. While in this position the key 53 is used for locking the cam in a fixed position from rotating which would permit the forward portion of the boat to be lifted by a gust of wind from the top 22 of the trailer T.

While the particular device herein shown and described is fully capable of attaining the objects and providing the advantages hereinbefore stated, it is to be understood that it is merely illustrative of the presently preferred form of my invention, and that I do not mean to limit myself to the details of construction or design herein shown other than as defined in the appended claims.

I claim:

1. A combination boat and trailer assembly which includes: a trailer having a roof formed with a centrally raised portion upwardly convex along the longitudinal axis, said roof being transversely arched and having longitudinal edges upwardly convex to a lesser degree than said raised portion, and forwardly convergent boat supporting rails extending along said roof edges; a boat mounted in inverted position on said trailer and having gunwales shaped for seating engagement with said boat rails; latch means slidably mounted within said trailer and movable laterally outwardly through said trailer roof to engage said boat gunwale and prevent displacement of said boat; locking means within said trailer to hold said latch means in an extended position; a guide rail extending longitudinally along the ridge line of said roof; and a rotatable guide wheel mounted in the bow of said boat and grooved for rotatable locking engagement with said guide rail, whereby as the stern of said boat is pulled rearwardly for demounting from said trailer said gunwales are lifted from said boat rails and the bow of said boat is guided by said guide rail until said stern is in a position to be lowered to the ground, permitting the safe demounting of the boat by one man.

2. A combination boat and trailer assembly which includes: a trailer having a roof formed with a centrally raised portion upwardly convex along the longitudinal axis, said roof being transversely arched and having longitudinal edges upwardly convex to a lesser degree than said raised portion, and forwardly convergent boat supporting rails extending along said roof edges; a boat mounted in inverted position on said trailer and having gunwales shaped for seating engagement with said boat rails; a guide rail extending longitudinally along the ridge line of said roof; and a rotatable guide wheel mounted in the bow of said boat and grooved for rotatable locking engagement with said guide rail, whereby as the stern of said boat is pulled rearwardly for demounting from said trailer said gunwales are lifted from said boat rails and the bow of said boat is guided by said guide rail until said stern is in a position to be lowered to the ground, permitting the safe demounting of the boat by one man.

3. A combination boat and trailer assembly which includes: a trailer having a roof formed with a centrally raised portion upwardly convex along the longitudinal axis, said roof being transversely arched and having longitudinal edges upwardly convex to a lesser degree than said raised portion, and forwardly convergent boat supporting rails extending along said roof edges; a boat mounted in inverted position on said trailer and having gunwales shaped for seating engagement with said boat rails; latch means slidably mounted within said trailer and movable laterally outwardly through said trailer roof to engage said boat gunwale and prevent displacement of said boat, the portion of said roof through which said latch means extend being curved sharply downwardly to present a substantially water-tight surface when said boat is demounted; locking means within said trailer to hold said latch means in an extended position; a guide rail extending longitudinally along the ridge line of said roof; and a rotatable guide wheel mounted in the bow of said boat and grooved for rotatable locking engagement with said guide rail, whereby as the stern of said boat is pulled rearwardly for demounting from said trailer said gunwales are lifted from said boat rails and the bow of said boat is guided by said guide rail until said stern is in a position to be lowered to the ground, permitting the safe demounting of the boat by one man.

RICHARD E. SOMERS.

REFERENCES CITED

The following references are of record in the file of this patent:

UNITED STATES PATENTS

| Number | Name | Date |
| --- | --- | --- |
| D. 146,232 | Patterson | Jan. 14, 1947 |
| D. 148,935 | Kuns | Mar. 9, 1948 |
| 370,331 | Hamilton | Sept. 20, 1887 |
| 1,327,589 | Bunker | Jan. 6, 1920 |
| 1,460,166 | McArthur | June 26, 1923 |
| 1,508,886 | Dautrick et al. | Sept. 16, 1924 |
| 2,001,619 | Levoyer | May 14, 1935 |
| 2,247,128 | Levey | June 24, 1941 |
| 2,310,431 | Hart | Feb. 9, 1943 |
| 2,389,338 | Zorc, Jr. | Nov. 20, 1945 |
| 2,412,162 | Lindblom | Dec. 3, 1946 |